United States Patent
Cumeralto et al.

(10) Patent No.: US 7,154,938 B2
(45) Date of Patent: Dec. 26, 2006

(54) RF COMMUNICATIONS SYSTEM UTILIZING DIGITAL MODULATION TO TRANSMIT AND RECEIVE DATA

(75) Inventors: Scott Cumeralto, Spokane, WA (US); Richard Devries, Spokane, WA (US); Gary Larson, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 784 days.

(21) Appl. No.: 10/335,553

(22) Filed: Dec. 31, 2002

(65) Prior Publication Data

US 2004/0125889 A1    Jul. 1, 2004

(51) Int. Cl.
  *H04B 1/00*    (2006.01)
(52) U.S. Cl. ............... 375/150; 375/132; 375/135; 375/146; 340/870.02
(58) Field of Classification Search ........ 375/132–138, 375/150; 340/870.02, 870.11, 870.18
See application file for complete search history.

(56) References Cited

U.S. PATENT DOCUMENTS

| | | | |
|---|---|---|---|
| 4,995,053 A | | 2/1991 | Simpson et al. |
| 5,258,997 A | * | 11/1993 | Fraser et al. .............. 375/146 |
| 5,774,502 A | | 6/1998 | Belcher et al. |
| 5,801,643 A | | 9/1998 | Williams et al. |
| 5,896,060 A | * | 4/1999 | Ovard et al. .............. 329/304 |
| 5,917,384 A | | 6/1999 | Chethik et al. |
| 6,289,038 B1 | * | 9/2001 | Park ........................ 375/131 |
| 6,434,194 B1 | * | 8/2002 | Eisenberg et al. .......... 375/238 |
| 6,515,977 B1 | * | 2/2003 | Bi et al. .................... 370/342 |
| 6,724,808 B1 | * | 4/2004 | Ohshima ................... 375/147 |
| 6,731,101 B1 | * | 5/2004 | Miyagawa et al. ...... 324/76.79 |
| 6,747,571 B1 | * | 6/2004 | Fierro et al. ........... 340/870.02 |
| 2002/0071478 A1 | | 6/2002 | Cornwall et al. |
| 2002/0109607 A1 | | 8/2002 | Cumeralto et al. |

FOREIGN PATENT DOCUMENTS

WO    WO 02/11382 A1    2/2002

* cited by examiner

*Primary Examiner*—Jay K. Patel
*Assistant Examiner*—Curtis B. Odom
(74) *Attorney, Agent, or Firm*—Patterson, Thuente, Skaar & Christensen, P.A.

(57) ABSTRACT

The RF communications system of the present invention wirelessly communicates data without encountering undue interference problems with other devices and complies with rules governing unlicensed, spectrum-sharing devices. In an example embodiment, a transmitter device includes a digital subsystem powered by a power supply that processes data from another device and a radio frequency (RF) sub-system that transmits the processed data using a frequency hopping scheme. The RF sub-system includes a microprocessor arrangement that ON-OFF keys a voltage controlled oscillator (VCO) and provides a frequency-hopping scheme. The VCO is coupled to a signal frequency spreading arrangement that spreads the signal to a predetermined transmission bandwidth, wherein the frequency spreading occurs during an ON state of the ON-OFF keying and the transmission bandwidth exceeds a reception bandwidth at which the signal will be decoded.

36 Claims, 6 Drawing Sheets

RF COMMUNICATIONS SYSTEM UTILIZING DIGITAL MODULATION TO TRANSMIT AND RECEIVE DATA

FIELD OF THE INVENTION

The present invention relates to low power radio frequency (RF) communication systems for transmitting data. Related applications include general telemetry, home security systems and utility metering systems that utilize spread spectrum communication techniques to transmit consumption data from a utility meter.

BACKGROUND OF THE INVENTION

RF communications systems are already known for transmitting data from an endpoint device to a receiver or intermediate transceiver. In a home security application, a tripped sensor at a window relays an RF message to a central gateway, which in turn relays a message via phone lines to a security-monitoring center. In another application, RF data communications are used to upload or download data via telemetry from an implantable medical device. In both of the above-described applications, the RF data stream is not interfered with because of the close proximity of the transmitting and receiving devices or the lacking presence of interfering devices.

RF communications systems are also being implemented to provide wireless connections to a communications network or to access an Internet Service Provider (ISP). In one such application, wireless ISPs (WISPs) provide internet service to those customers that do not have access to cable or to high speed DSL (digital subscriber line) internet service because the major cable service provider in the area has not laid the "last mile" of cable (or the telephone operating company does not provide DSL service) to the customer. WISP systems typically operate with low power R.F. in the 900 MHz range.

Wireless automatic meter reading systems are also well known. Typically, a utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of encoder transmitters that must be deployed as part of a utility meter reading system for a large metropolitan area.

In 1985, as an attempt to stimulate the production and use of wireless network products, the FCC modified Part 15 of the radio spectrum regulation, which governs unlicensed devices. The modification authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC allows users to operate wireless products, such as utility metering systems, without obtaining FCC licenses if the products meet certain requirements. This additional flexibility in the use of the frequency spectrum eliminates the need for the user organizations to perform cost and time-consuming frequency planning to coordinate radio installations that will avoid interference with existing radio systems.

Spread spectrum modulators use one of two methods to spread the signal over a wider area. The first method is that of direct sequence spread spectrum, or DSSS, while the second is frequency hopping spread spectrum, or FHSS. DSSS combines a data signal at the sending station with a higher data rate bit sequence, which many refer to as a chipping code (also known as a processing gain). A high processing gain increases the signals resistance to interference. FHSS, on the other hand, relies on the distribution of a data signal randomly hopped across a number of defined frequency channels to avoid interference. While DSSS has potentially higher data transmission rates than FHSS, DSSS has been much more costly than FHSS, has had higher power consumption, and is more susceptible to noise.

FHSS, on the other hand, operates by taking the data signal and modulating it with a carrier signal that hops from frequency to frequency as a function of time over a wide band of frequencies. A hopping code determines the frequencies the radio will transmit and in which order. To properly receive the signal, the receiver must be set to the same hopping code and listen to the incoming signal at the right time and correct frequency. If the radio encounters interference on one frequency, then the radio will retransmit the signal on a subsequent hop on another frequency. Because of the nature of its modulation technique, FHSS can achieve up to 2 Mbps data rates. It is possible to have operating radios use FHSS within the same frequency band and not interfere, assuming they each use a different hopping pattern. The frequency hopping technique reduces interference because an interfering signal from a narrowband system will only affect the spread spectrum signal if both are transmitting at the same frequency and at the same time.

The aggregate interference using FHSS should be very low, resulting in little or no bit errors. However, depending on the frequency that other low power RF communication systems may be operating, some signal collisions may occur and data may be lost.

With respect to meter reading applications in the context of wireless radio networks there is a potential for collisions between transmissions of a large number of units concentrated in a relatively small area. This problem is particularly acute, for example, in the context of sub-metering applications which involve the allocation of utility usage readings over a large number of units in an apartment, high rise, office building or other dwelling where multiple utility accounts may be located in the same building or in the same building complex. Sub-metering applications also tend to present severe challenges in terms of installation and operation due to structures limiting or blocking effective antenna coverage.

In 2002, the FCC further modified Part 15 of the radio spectrum regulation to provide for the introduction of new digital transmission technologies, thereby eliminate any regulatory distinction between direct sequence spread spectrum (DSSS) systems and systems using other forms of digital modulation. Digital modulation systems will be subject to the same power output maximum, 1 Watt, and power spectral density limits, 8 dBm per 3 kHz, as in DSSS systems but will not be subject to the same processing gain constraints as in prior RF communication systems.

In view of the above, there is a need for an RF communications system that wirelessly communicates data without encountering undue interference problems with other devices and that complies with revised Part 15.247 of the FCC rules governing unlicensed, spectrum-sharing devices. There is also a need for digital modulation techniques that preserve the battery-life of end-point transmitters, that can eliminate intermediate repeaters, and that enable improved signal collision avoidance.

SUMMARY OF THE INVENTION

The present invention is a spectrum-sharing RF communications method and system that is a form of direct sequence spread spectrum modulation which spreads the transmission energy of the data signal across a predetermined transmission band during each half bit/chip interval.

In one embodiment the method of communicating data between wireless devices that comprises FSK (frequency shift keying) modulating a data signal that is encoded with a step spreading code for spreading the data signal frequency within a transmission bandwidth. The data signal is then modulated onto an RF carrier and the RF carrier is ON/OFF keyed as the data signal is being transmitted. A selected number of channels are then stepped through during the ON state of the ON/OFF keying while transmitting at an increased power level is thus spreading the energy of the data signal over the transmission bandwidth, thereby reducing interference effects from other RF communication devices and thus facilitating spectrum sharing. The data signal is then received and decoded in at least one AM receiver that is synchronized to follow a frequency hopping sequence of the transmitted data signal. The AM receiver is also configured to receive the data signal at a reception bandwidth that is less than the transmission bandwidth (e.g., narrowband receiver). In a related embodiment, the data signal could also be received and decoded by a wideband receiver.

In another embodiment, a transmitter device includes a digital subsystem powered by a power supply that processes data from another device and a radio frequency (RF) subsystem that transmits the processed data using a frequency hopping scheme. The RF sub-system includes a microprocessor arrangement that ON-OFF keys a voltage controlled oscillator (VCO) and provides a frequency-hopping scheme. The VCO is coupled to a signal frequency spreading arrangement that spreads the signal to a predetermined transmission bandwidth, wherein the frequency hopping occurs during the ON state of the ON-OFF keying and wherein the transmission bandwidth exceeds a reception bandwidth at which the signal will be decoded.

In another example embodiment, a transmitter spreads the energy of the transmitted data signal, which has been FSK modulated, across a 500 kHz band during each half bit/chip interval. The transmitter modulates the existing FSK modulated signal onto an RF carrier while simultaneously ON/OFF Keying (OOK) the RF carrier. The resulting receiving technology requires no changes and can decode the information thus allowing Part 15.249 receivers to decode simultaneously Part 15.249 and Part 15.247 devices. Additionally, future DSP algorithms can utilize the FM hopping sequence to provide additional link margin.

DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION OF THE PREFERRED EMBODIMENTS

The present invention is generally directed to a method and a system for transmitting data over R.F. with minimal effect by other low power R.F. transmissions. The present data transmission method also permits higher-powered R.F. transmissions that meet FCC guidelines. While the present invention is not necessarily limited to such an application, the invention will be better appreciated using a discussion of example embodiments in such a specific context.

Figure 1:
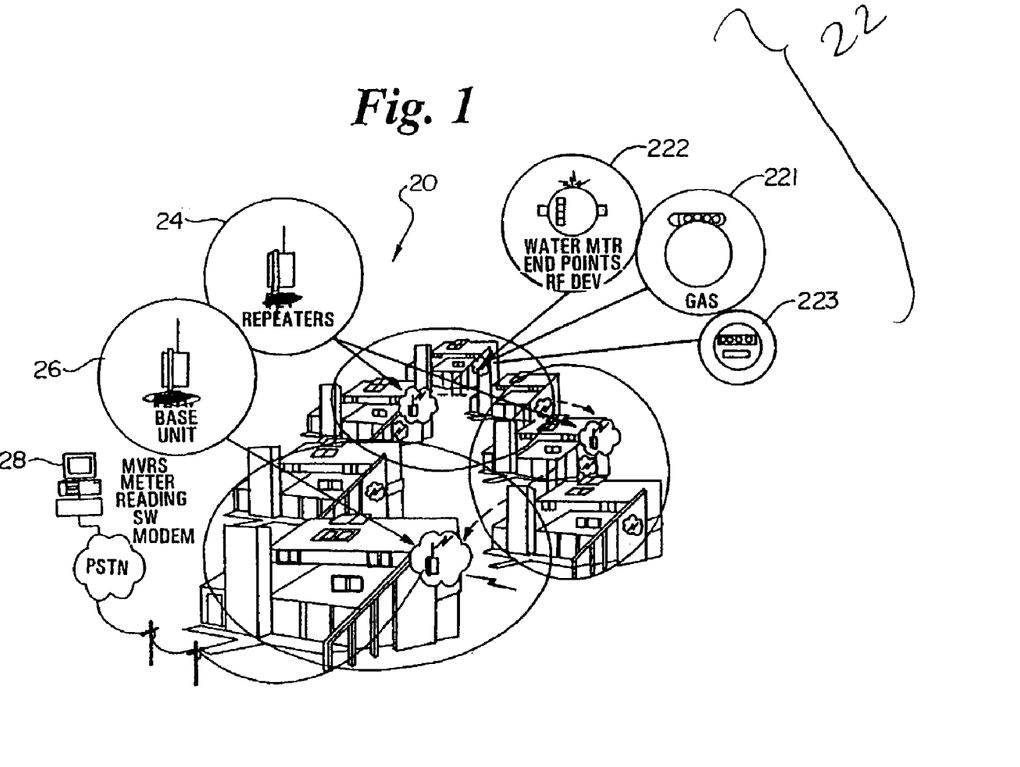
FIG. 1 is a diagram of a utility metering system that incorporates the radio frequency (RF) data communications method of the present invention.

Referring to FIG. 1, the RF communications method of the present invention is incorporated into a utility metering system that monitors and retains data on a plurality of water, electric, and gas utility meters (e.g., up to 1000 utility meters), the meters typically being located within multi-dwelling or high-rise environments. Utility metering system 20, illustrated in FIG. 1, generally comprises a plurality of meter end point encoder transmitter devices 22, or ERT modules 22, that include gas ERT modules 221, water ERT modules 222 and electric ERT modules 223. System 20 further comprises a repeater 24, one or more base units 26, and a head-end, software-driven, meter reading analysis device 28.

In this example embodiment, ERT modules 22 are preferably radio frequency (RF) transmit-only devices that gather and encode utility (gas, electric or water) consumption and tamper information. The modules then transmit this data with other information via RF to repeaters 24 or base units 26 periodically, for example every 10 to 15 minutes, using a digital modulation technology of the present invention. In one example application, electric modules 223 are preferably installed under the glass of standard meters so as not to require battery power, while modules 221 and 222, for gas and water respectively, are preferably self-contained, low power units that are powered by long-life batteries. Modules 221 and 222 utilize a very slow "bubble up" rate to minimize power consumption and extend the life of the batteries as well as minimize unnecessary RF interference to other users in the RF band. Each of modules 22 with the digital modulation capabilities is designed to be installed by the meter manufacturer during the manufacturing process or to be easily retrofitted into existing meters.

In this example embodiment, ERT module 22 complies with revised Part 15.247 of the FCC rules governing spread spectrum devices and operates in the 900 MHz unlicensed band at a maximum peak power level of 1 watt. ERT module 22 can be permanently mounted such that it retains a distance of 20 centimeters (7.9 inches) from all persons in order to comply with FCC RF exposure levels.

Each base unit 26 is equipped to transmit the utility data to the meter-reading analysis device 28. The transmission from the base point encoder transceiver remote collector (ERTRC) unit 26 is preferably performed via a standard telephone connection (PSTN) 30 or, alternatively, via a cellular connection. Each base ERTRC unit 26 is preferably mounted at a central point in multi-dwelling complex wherein ease of interconnection to power and telephone lines are available. In a preferred embodiment, each base unit 26 can monitor and retain data on up to 1000 ERT modules 22. The data is gathered from the ERT modules 22 via a digitally modulated RF signal that maximizes the coverage range of each base unit 26, while minimizing the costs of the ERT modules 22.

Meter reading analysis device 28 operates to process the usage data that is preferably sent by the base unit 26 via PSTN or cellular telephone. It will be understood that multiple base units 26 may be deployed across a metropolitan area, for example, to provide effective meter reading coverage as needed. Meter reading analysis device 28 preferably comprises a standard PC whereby it is able to not only process the data received from the base units 26 but also provides an interactive, graphical user interface to allow users to extract and report key information. The software run by meter reading analysis device is preferably Itron's MV-RS Meter Reading Software.

Further details regarding installation and mounting of the general components of system 20 may be found in the Itron "Installation Guide for the PETRC and ERT Repeater Units used in the PETNET Submetering System", Feb. 20, 2001, which is hereby incorporated by reference.

ERT module 22 is a fully synthesized FM transmitter that operates in the 902 to 928 MHz frequency band and operates pursuant to revised FCC rule part 15.427 as a digitally modulated device capable of utilizing five or more channels. The ERT module has an output power capability of 1 watt, but depending on the application the nominal output power is less. Factors such as battery life (power supply), range and coverage, component cost, etc., all contribute to defining the cost effective power output. In this example, the cost effective RF nominal output power of the ERT module 22 is +15 dBm with a modulation of +/−250 KHz. ERT module operates in an asynchronous mode with a message transmit rate of 10–15 minutes, most preferably 10 minutes, and provides an estimated battery life of five years. ERT modules 22 transmit on a pseudo-random frequency and time, and while capable of sequencing through the twenty-five random frequencies, preferably utilizes only six of possible twenty-five acquisition channels, i.e., three lower and three upper acquisition channels through which the ERT module rotates. However, any one of the twenty-five channels can be considered an acquisition channel and is dependent on the configuration of base unit 26.

Figure 2:
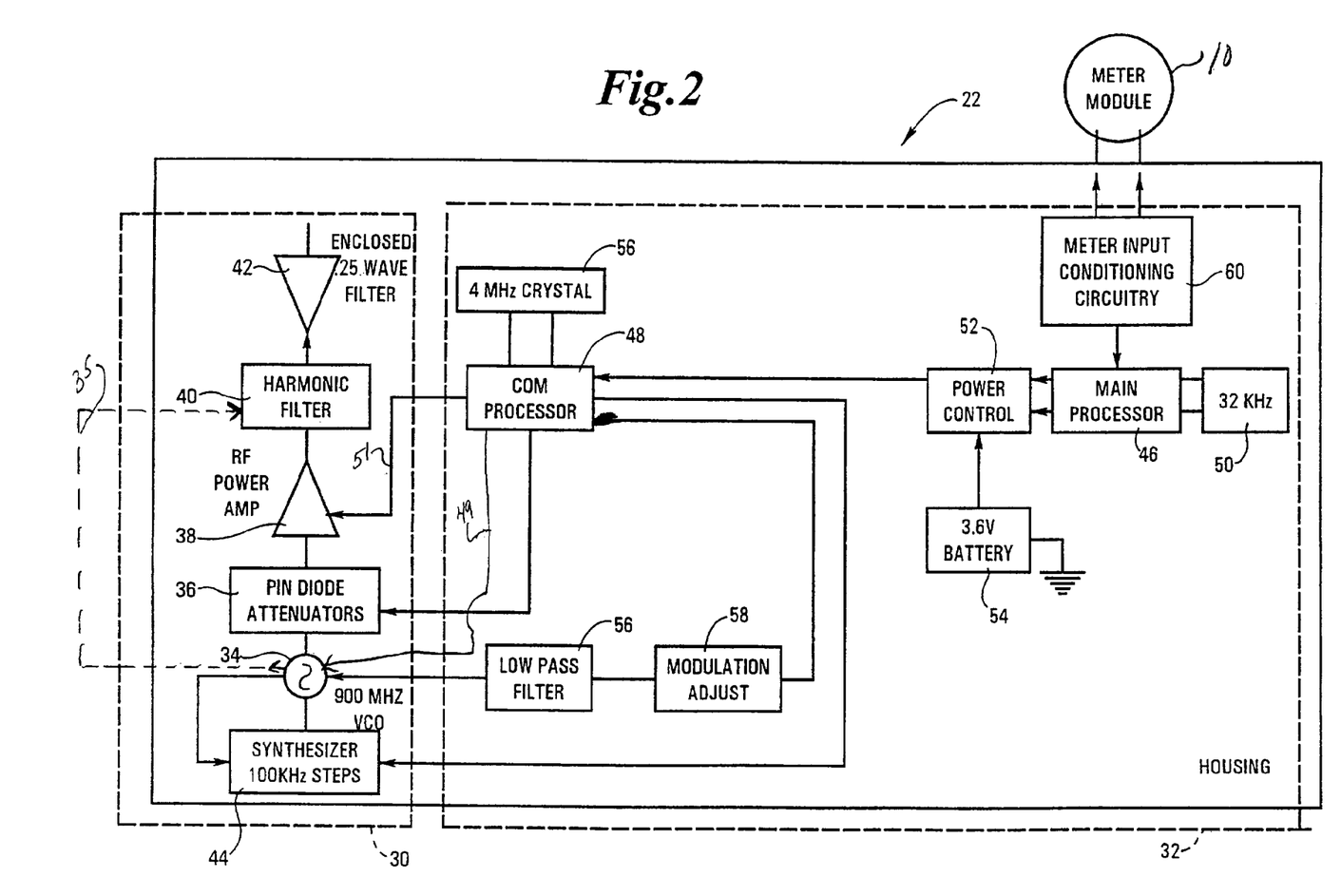
FIG. 2 is a block diagram of a transmitter device configured to communicate via the RF communications method of the present invention.

Referring now to FIG. 2, a block diagram of a transmitter device 22 is illustrated that is configured to communicate via the RF communications method of the present invention. The block diagram depicts the major components of the transmitter of ERT module 22, which includes an RF subsystem 30 in combination with a digital subsystem 32. In this embodiment, RF subsystem 30 includes a voltage-controlled oscillator (VCO) 34 followed by pin diode attenuators (a.k.a. an RF switch) 36. RF switch 36 is followed by an RF power amplifier 38 which is followed by a low pass filter 40 for harmonic suppression. Low pass filter 40 is followed by a quarter-wave dipole antenna 42. A frequency synthesizer 44 is provided and operates to tune VCO 34 to the proper channel and maintain the channel under varying load conditions.

The RF switch 36 is preferably comprised of two PIN diodes that are used as a shunt type reflective switch. The PIN diodes are preferably in parallel for RF to reduce their combined "on" impedance to ground, and in series for DC to reduce the current required to operate them. The RF switch 36 is controlled by an emitter follower that is driven by a low pass filter to control the rate at which it turns on and off.

Low pass filter 40 is preferably a fifth order low pass filter that is used to reduce harmonic emissions. In its preferred configuration, low pass filter 40 utilizes transmission lines instead of inductors, and utilizes two capacitors at each of the three nodes of the filter due to the low self-resonance frequency of the capacitors. This self-resonance occurs in the stopband near the second harmonic, which actually helps to improve the filter performance over what it would otherwise be. The resulting filter has a rather narrow passband response and has an insertion loss around 1 dB.

Digital subsystem 32 includes two microprocessors: (1) the main processor 46; and (2) the communications (COMM) processor 48. Main processor 46 runs continuously, however, at low speed utilizing a 32 KHz oscillator 50 to conserve power. The main processor 46 is programmed with the serial number and the modulation sequence of ERT module 22 at the time of manufacture. Main processor 46 has the responsibilities within ERT module 22 of overall system timing and supervision including maintaining the position in the hop sequence, accumulating sensor data, operation of the transmitter power supply charge circuit 52 (described below), monitoring the condition of module battery 54, and providing the message to be sent and the frequency to be used to the COMM processor 48 at the ERT module message transmission time. Main processor 46 is preferably additionally provided with various test modes to aid in the manufacture and installation of ERT module 22.

In an example embodiment, module 22 rotates through all twenty-five acquisition channels until it finds the six acquisition channels upon which it is to transmit to base unit 26. During normal operation of ERT module 22 such a channel rotation would take over four hours utilizing the standard, established transmission patterns, however, upon installation, ERT module preferably operates in high speed mode wherein ERT module 22 rotates through the twenty-five acquisition channels at a rate of approximately one every ten seconds, for up to forty minutes. Such a high-speed mode allows an installer of ERT module 22 to verify installation and operation within a reasonably short period of time.

COMM processor 48 operates when RF subsystem 30 is being used and utilizes a clock rate of 4 MHz, provided by crystal oscillator 56. COMM processor 48 receives the ERT module message to be sent and the channel upon which to send the message from main processor 46. COMM processor 48 computes a 32 bit cyclic redundancy code (CRC) for the message and sets frequency synthesizer 44 to the proper frequency through monitoring of VCO 34 via low pass filter 56 and modulation adjust circuitry 58. COMM processor 48 additionally operates to increase the output power at turn-on to its maximum value in a controlled manner to minimize out-of-band spurs. Like main processor 46, COMM processor 48 is preferably provided with various test modes to aid in the manufacture and installation of ERT module 22. In a related embodiment, COMM processor 48 communicates to VCO 34 via line 49, the digital spreading information before the signal is broadcast or transmitted.

Alternatively, main processor 46 and COMM processor 48 could be combined as a single, dual-speed hi-lo processor such as that available from Texas Instruments.

For metering applications, digital subsystem 32 further includes meter input conditioning circuitry 60 (i.e., a sensor interface circuit), such as a debounce and divide-by-two circuit to capture short duration pulses without requiring rapid sampling by main processor 46 that is coupled to meter 10. However, numerous other types of sensor interface circuits, e.g., register type sensors, may be used as appropriate or desired without departing from the spirit or scope of the invention.

The transmitter power supply charge circuit, indicated in FIG. 2 by block 52 labeled power control, supplies a regulated five volts at up to 200 milliAmps during transmission of the ERT module message, however current ERT module design requires only 50 milliamps. The nominal charge current for the transmitter power supply charge circuit varies between three milliamps and less than one milliamp during a charge cycle. The transmitter power supply charge circuit uses a charge pump to slowly charge a large value capacitor, e.g., 4700 microfarads, to approximately six volts. During transmission of the ERT module message, the power amplifier 38 runs off of this capacitor allowing ERT module 22 to have a high power transmitter while limiting battery drain. COMM processor 48 also signals power amplifier 38 via line 51 to boost the transmitted signals power level after signal spreading.

ERT module transmitter 22 described above is preferably manufactured using a two-sided PC board design. The two-sided design, while more difficult than a multi-layer board design, greatly reduces production costs. Design considerations pertinent to the two-sided design include providing no traces through the ground plane in the RF section, this is a feature that is critical to reliable and repeatable RF performance. Further design considerations include limiting the overall number of traces on the ground plane side of the board for further improved RF performance and utilizing large diameter via holes for RF connections to the ground plane to reduce inductance.

In the metering application, main processor 46 continuously keeps track of time, sensor counts from the utility meter, and tamper counts from the utility meter. At 30 seconds prior to the time to send the ERT module message, main processor 46 supplies 1 KHz pulses to the charge pump of the transmitter supply charge circuit 52 until it receives an indication from the charge pump that the charge pump capacitor is fully charged; if main processor 46 does not receive a fully charged signal by transmission time a low battery flag is set within main processor 46.

At the time of transmission and having received an indication of a fully charged capacitor, main processor 46 initiates operation of the "bubble-up" architecture of the ERT module transmitter by turning on COMM processor 48 and awaiting a response therefrom; if no response is returned, main processor 46 turns off COMM processor 48. Upon receiving a response from COMM processor 48, which comes in the form of a request for ERT module message data and frequency transmission data, main processor 46 replies to the request. After receiving the requested data, COMM processor 48 checks an inter-processor checksum to determine if it should continue with its message sending operations.

In a related embodiment, the number of components can be reduced by electrically coupling VCO 34 directly to filter 40 via line 35, where VCO 34 is a power oscillator that increases the transmitted signal's power level.

Figure 3A:
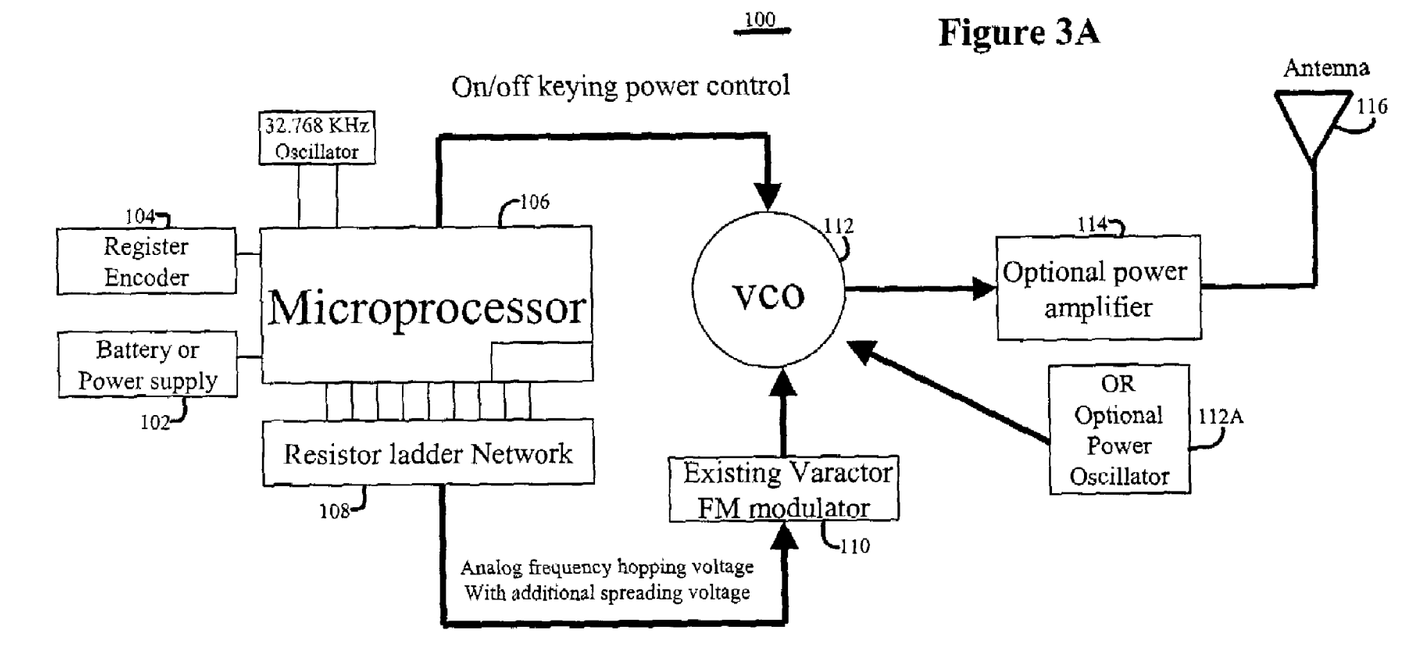
FIG. 3A is a block diagram of a transmitter device similar to the device illustrated in FIG. 2 configured according to teachings of the present invention.

Referring now to FIG. 3A, a block diagram of a transmitter device 100 similar to the transmitter device shown in FIG. 2 is configured according to teachings of the present invention. In particular, transmitter device 100 includes a power supply 102 and a register encoder 104, both of which are coupled to a microprocessor 106. Microprocessor 106 is connected to a resistor ladder network 108 that converts the binary signals to analog voltage levels that drive a varactor arrangement 110. Varactor arrangement 110 operates as an FM modulator of a voltage controlled oscillator (VCO) 112 that has a data signal amplified by a power amplifier 114 before it's transmitted via antenna 116. Microprocessor 106 and resistor ladder 108 in combination provide an analog frequency sweeping voltage with an additional spreading voltage to varactor arrangement 110 that will drive VCO 112. In a related embodiment, varactor arrangement 110 is substitutable with a pin diode arrangement as lower cost alternative. In another embodiment, power amplifier 114 can be eliminated as a means for boosting the transmitted signal by using a power oscillator in place of oscillator 112.

In this example embodiment, transmitter device 100 comprises a digital subsystem that processes data from another device. A radio frequency (RF) sub-system of device 100 transmits the processed data using a frequency hopping spread spectrum signal, the RF sub-system comprises microprocessor arrangement 106 that ON-OFF keys voltage controlled oscillator (VCO) 112 and provides a frequency-hopping scheme. VCO 112 is coupled to a signal frequency spreading arrangement, such as varactor arrangement 110, which spreads the signal to a predetermined transmission bandwidth. The frequency hopping occurs during an ON state of the ON-OFF keying and the transmission bandwidth exceeds a reception bandwidth at the receiver at which the signal will be decoded.

In this example embodiment, the frequency spreading arrangement includes a varactor-transistor circuit arrangement that spreads the signal so as to exceed a predetermined bandwidth. The varactor is multiplexed to provide frequency hopping and spreading of the transmitted signal's energy over a frequency band that exceeds a predetermined reception bandwidth.

In another embodiment, the varactor-transistor arrangement includes two varactors and two transistors (not shown). A first varactor provides the frequency-hopping scheme and a second varactor spreads the transmitted signal's energy over a frequency band that exceeds a predetermined reception bandwidth.

In another related embodiment, the frequency spreading arrangement includes a pin diode circuit arrangement that is multiplexed to provide frequency hopping and to spread the transmitted signal's energy over a frequency band that exceeds a predetermined reception bandwidth. In one example embodiment, the voltage-controlled oscillator is a power oscillator that transmits the signal at a higher power level.

In another example embodiment, a meter end point encoder transmitter device (similar to FIG. 2) is operably coupled to a utility meter and forms part of a utility meter reading system. The transmitter device (not shown) includes a digital subsystem, powered by a power supply, that processes consumption data from the utility meter and a radio frequency (RF) sub-system that transmits consumption data from the utility meter using a frequency hopping spread spectrum signal. The RF sub-system includes a microprocessor arrangement that ON-OFF keys a voltage controlled oscillator (VCO) and provides a frequency-hopping scheme. The VCO is coupled to a varactor-transistor arrangement that spreads the signal to a predetermined transmission bandwidth, wherein the transmission bandwidth exceeds a reception bandwidth at which the signal will be decoded. The frequency hopping occurs during an ON state of the ON-OFF keying.

Figure 3B:
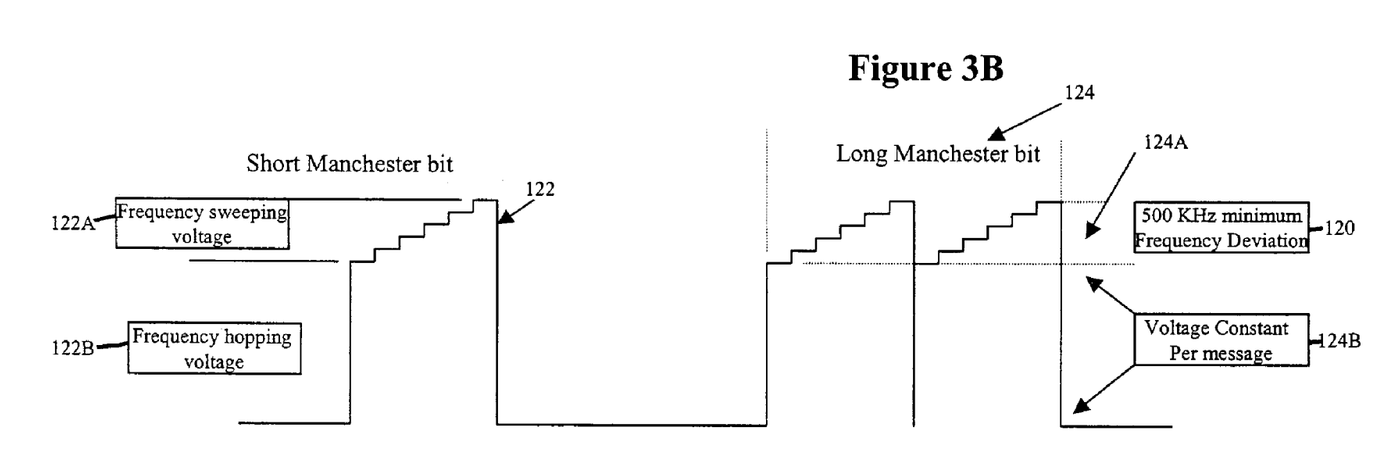
FIG. 3B is an example of the encoded data transmitted by the device of FIG. 3A.

Referring now to FIG. 3B, there is illustrated an example of the encoded data transmitted by the device of FIG. 3A. The encoded data 120 is comprised of a Short Manchester bit 122 and a Long Manchester bit 124, each of which include stair-stepped voltage 122A (frequency sweeping voltage) and 124A (frequency deviation with a bandwidth minimum), respectively. The data bits further comprise a frequency hopping voltage (122B) and a voltage constant per message (124B).

Figure 4:
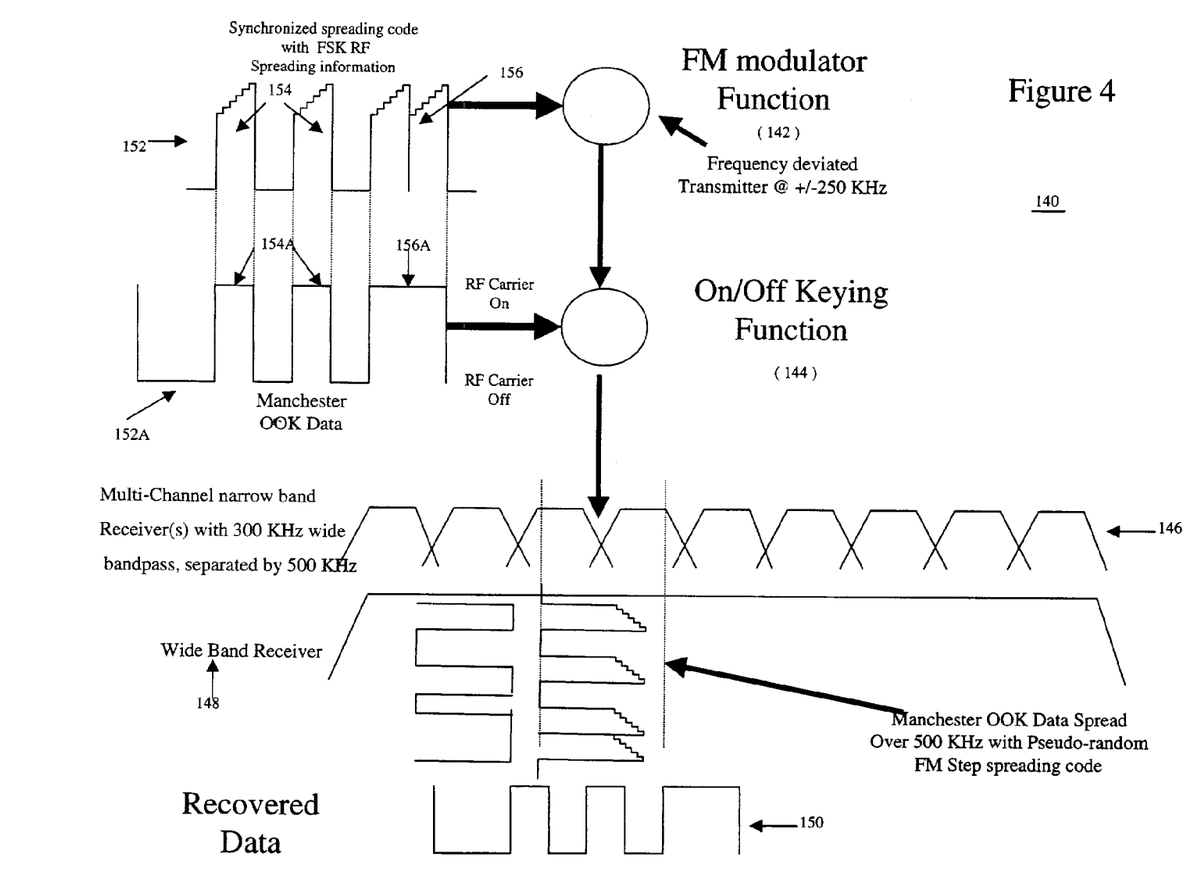
FIG. 4 is a process flow diagram illustrating a method of digitally modulating and transmitting data according to the present invention.

Referring now to FIG. 4, a process flow diagram 140 illustrates a method of digitally modulating and transmitting data according to the present invention. In this example embodiment, the communications method includes an FM modulation function 142 and an ON/OFF Keying (OOK) function 144 which modulate the data signal that is received by narrowband AM receivers 146 and a wideband receiver 148 that is converted into recovered data 150. In this example embodiment, FM modulator 142 deviates the frequency of the transmitter such that the signal deviates +/−250 KHz (or greater), resulting in a 500 KHz wide signal (or greater). The multi-channel narrowband AM receivers receive the signal with a 300 KHz wide bandpass and are separated by 500 KHz bands. The wideband receiver, on the other hand, receives all of the energy in the transmitted signal and decodes all of the data sent.

The method of communicating data via a transmitter device includes FSK (frequency shift keying) modulating a data signal 152 that is encoded with a step spreading code that spreads the data signal frequency within a transmission bandwidth. In this example embodiment, the spreading code is synchronized with a first frequency 154 of the FSK data signal and is also synchronized with a second frequency 156 of the FSK data signal as its being modulated by FM modulator 142. The data signal is then modulated onto an RF carrier signal 152A, having Manchester FSK data at first frequency 154A and at second frequency 156A, and then the RF carrier is ON/OFF keyed as the data signal is being transmitted.

The data communication method further includes stepping through a selected number of channels during the ON state of the ON/OFF keying while transmitting at an increased power level. This step effectively spreads the energy of the data signal over the transmission bandwidth, which in this example embodiment is 500 KHz, thereby reducing interference effects from other users or RF communication devices and thus facilitates spectrum sharing. The data signal is then received and decoded in at least one AM receiver that is synchronized to follow a frequency hopping sequence of the transmitted data signal of the transmitter. In addition, the receiver is configured to receive the data signal at a predefined reception bandwidth, which in this example embodiment is 300 KHz, wherein the transmission bandwidth (e.g., 500 KHz) is greater than a reception bandwidth (e.g., 300 KHz).

In this example embodiment, the transmitted data signal is preferably received and decoded by a plurality of AM narrowband receivers 146, which are separated by 500 KHz bands, each having a reception bandwidth less than the overall spread bandwidth (or transmission bandwidth). The data signal is also amplified as it's being transmitted at a power level below 1 watt and is preferably amplified via a power amplifier that is included before the antenna. In another embodiment, the signal is amplified via a substituted power oscillator to increase the transmitted signal's power level. This approach provides a cost savings as the power amplifier is not utilized.

As the data signal arrives and is being decoded at the narrowband receivers, a first step is sensed within a bit within the data signal (see stepped data within data stream at frequency 154, FIG. 4) while the narrowband receiver sweeps across the data at the same rate as the steps are occurring across each bit, thereby increasing sensitivity and reducing effects of interference at the narrowband receivers. The receivers process the data via multiple channels and reconstruct the data at the receiver level. Recovered data 150 is an example of the decoded data received by the narrowband receivers.

Where the communications system includes a wideband AM receiver, the data is decoded as indicated in FIG. 4 to arrive at recovered data 150. The Manchester data is spread over the 500 KHz band by the step spreading code in the original FSK modulated data.

In a related embodiment, collecting all of the energy by summing the data on the plurality of narrowband AM receivers improves data reception accuracy. Data from those narrowband receivers exhibiting interference is rejected to avoid corrupting the data. In a cost effective embodiment, a single DSP can be used to collect the multiple channel data and process it.

Figure 5:
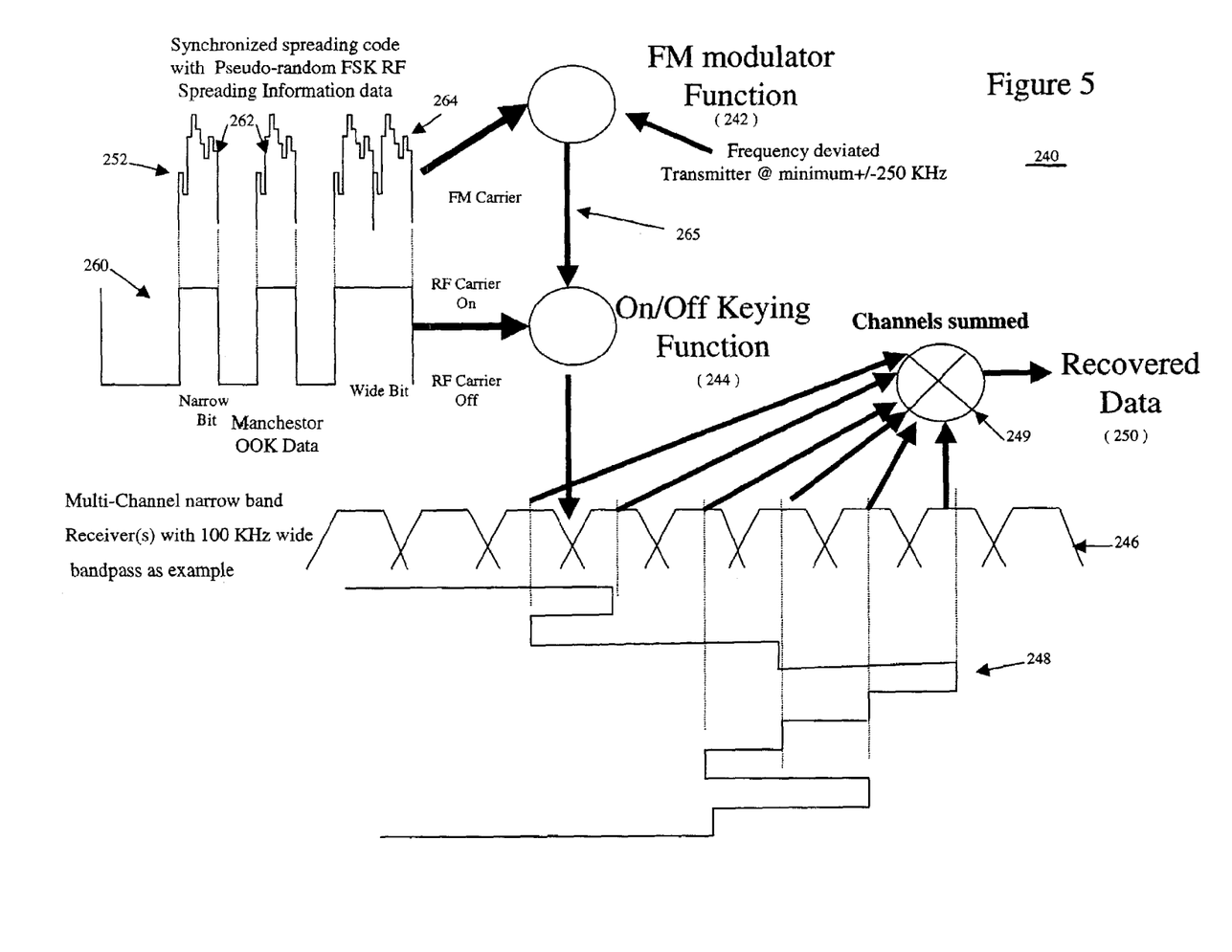
FIG. 5 is a process flow diagram illustrating a method of digitally modulating and transmitting pseudo-random RF spreading information according to the present invention.

Referring now to FIG. 5, a process flow diagram 240 illustrates a method of digitally modulating and transmitting pseudo-random data according to the present invention. In this example embodiment, the communications method includes an FM modulation function 242 and an ON/OFF Keying (OOK) function 244 modulate the data signal that is received by narrowband AM receivers 246 and a wideband receiver 248 that is converted into recovered data 250. In this example embodiment, FM modulator 242 frequency deviates the frequency of the transmitter such that the signal deviates +/−250 KHz (or greater), resulting in a 500 KHz wide signal (or greater). The multi-channel narrowband AM receivers receive the signal with a 100 KHz wide bandpass and are separated by a larger frequency band. The wideband receiver, on the other hand, receives all of the energy in the transmitted signal and decodes all of the data sent.

The method of communicating data via a transmitter device includes OOK (ON/OFF keying) modulating an information generated data signal 260 that is encoded with a pseudo-random step spreading code (252) that spreads the data signal frequency within a transmission bandwidth. In this example embodiment, the spreading code is synchronized with a first frequency 252 of the FSK data signal and also synchronized with a second frequency of the FSK data signal as its being modulated by the FM modulator 242. The data signal is then modulated onto an RF carrier signal 265, having Manchester FSK data at first frequency 262 and at second frequency 264, and then the RF carrier is ON/OFF keyed as the data signal is being transmitted.

The data communication method further includes stepping through a selected number of channels during the ON state of the ON/OFF keying while transmitting at an increased power level. This step effectively spreads the energy of the data signal over the transmission bandwidth, which in this example embodiment is 500 KHz, thereby reducing interference effects from other users (or RF communication devices) and thus facilitates spectrum sharing. The data signal is then received and decoded in at least one AM receiver 246 that is synchronized to follow a frequency hopping sequence of the transmitted data signal of the transmitter. In addition, the receiver is configured to receive the data signal at a predefined reception bandwidth, which in this example embodiment is 100 KHz, wherein the transmission bandwidth (e.g., 500 KHz) is greater than a reception bandwidth (e.g., 100 KHz).

In this example embodiment, the transmitted data signal is preferably received and decoded by a plurality of AM narrowband receivers 246, which are separated, with each having a reception bandwidth less than the overall spread bandwidth (or transmission bandwidth). The data signal is also amplified as it's being transmitted at a power level below 1 watt and is preferably amplified via a power amplifier that is included before the antenna. In another embodiment, the signal is amplified via a substituted power oscillator to increase the transmitted signal's power level. This approach provides a cost savings as the power amplifier is not utilized.

As the data signal arrives and is being decoded at the narrowband receivers, a first step is sensed within a bit within the data signal (see random data within data stream at frequency 252, FIG. 5) while the narrowband receiver sweeps across the data at the same rate as the random steps are occurring across each bit, thereby increasing sensitivity and reducing effects of interference at the narrowband receivers. The receivers process the data via multiple channels and reconstruct the data at the receiver level. Recovered data 250 is an example of the decoded data received by the narrowband receivers.

Where the communications system includes a wideband AM receiver, the data is decoded as indicated in FIG. 5 to arrive at recovered data 250. The Manchester encoded OOK data is spread over a wide frequency band, greater than the reception bandwidth, by the step spreading code during the ON portion of the Manchester OOK modulated data.

In this embodiment, collecting all of the energy by summing the data at 249 on the plurality of narrowband AM receivers improves data reception accuracy. Data from those narrowband receivers exhibiting interference is rejected to avoid corrupting the data.

In another embodiment, a modulation scheme is a derivative between the multiple frequencies per bit (DSSS or digital modulation) technique and the multiple bits per frequency (FHSS) technique that involves transmitting data in a single frequency per bit scheme (or changing the frequency for each bit). In this approach, the microprocessor changes the frequency via a resistor ladder or a digital to analog converter, having the output coupled to a varactor tuning diode on the VCO. The resulting frequency change occurs just prior to the carrier "ON" condition or state and holds this frequency through the bit ON time. During the following OFF condition, time is available to change frequency and stabilize to the next channel. The new frequency is held until the ON bit is completed and this sequence continues until the full message is completely transmitted. This approach has the advantage of ease of implementation versus the multiple frequencies per bit approach, meets the "digital modulation requirements" of the FCC and provides better overall system performance.

In this embodiment, the receiving unit operates as a broadband receiver capable of receiving all frequencies used throughout the message as well as a narrow band receiver which tracks the frequency changes that are used in each message. The number of frequencies used could be as many frequencies as message bits or could be a reduced number of frequencies that would be recycled until message completion. In a related embodiment, a special preamble is used to provide a synchronization pattern of frequencies that allows the receiving device to utilize any one of many frequencies to monitor those that are used in the synchronizing pattern so as to provide interference protection.

In addition, in order to correct for loss of information from any one or more of the channels that are in use (or the frequencies of the selected receivers in the system), the system incorporates an error correction algorithm that corrects for a predefined number of errors. This algorithm would be adaptive with adaptation occurring when the bit error performance on any combination of channels is too high. The adaptation could either be a selection of new frequencies or additional overhead bits that would utilize the existing frequencies but provide additional bits on the message to could correct for the bits lost on those frequencies that are corrupted.

In embodiments of a device with a synthesizer, each frequency change could be accomplished by digitally programming a new channel into the synthesizer during the bit OFF time, thus allowing the synthesizer-VCO to stabilize during the remaining bit OFF time. The new channel would remain throughout the next bit ON time. This process would be recycled until the end of message transmission.

The present approach increases transmission power without creating additional interference while lowering overall system costs. In contrast, in one prior art meter reading system, the end point encoder transmitters attached to each utility meter utilize a low power FHSS transmitter that communicates with a network of intermediate repeaters that convert these transmissions to DSSS transmissions and are retransmitted by a high power transmitter to base stations for collection and processing. While this approach allows for the use of lower cost end point encoder transmitters, it increases the costs of the system overall because more intermediate repeaters are required for effective coverage due to the use of low cost, low power transmitters.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A method of communicating data comprising the steps of:

preparing a data signal for transmission, including applying a step spreading code to the data signal to spread the data signal frequency within a transmission bandwidth;

placing the data signal onto an RF carrier and ON/OFF keying the RF carrier based on the data signal;

transmitting the data signal on the RF carrier such that the data signal is stepped through a selected number of channels during the ON state of the ON/OFF keying thus spreading the data signal over the transmission bandwidth, thereby reducing interference effects from other RF communication devices and thus facilitating spectrum sharing; and receiving and decoding the data signal in at least one amplitude modulation (AM) receiver adapted to be synchronized to follow a frequency hopping sequence of the transmitted data signal and to receive the data signal at a reception bandwidth, wherein the transmission bandwidth is greater than a reception bandwidth.

2. The method of claim 1, wherein the step of decoding the transmitted data signal further comprises receiving and decoding the data signal at a plurality of AM receivers, wherein each of the receivers receives the data signal at a bandwidth less than an overall spread bandwidth.

3. The method of claim 1, wherein the data signal is transmitted at a power level below 1 watt.

4. The method of claim 1, while decoding the data signal, further comprising the step of sensing a first step within a bit within the data signal and sweeping the narrowband receiver at the same rate as the steps are occurring across each bit, thereby increasing sensitivity and reducing effects of interference.

5. The method of claim 2, after decoding the data signal, further comprising the steps of:
summing certain outputs of the plurality of narrowband AM receivers; and
rejecting output from any of the narrowband receivers that exhibit interference.

6. The method of claim 1, wherein the step of on/off keying the data signal further comprises the step of amplifying the data signal as its being transmitted.

7. The method of claim 1, after decoding the data signal, further comprising the step of receiving and decoding the data signal at a wideband AM receiver.

8. The method of claim 1, wherein the step of on/off keying the data signal further comprises the step of utilizing a power oscillator to transmit the signal at a higher power level.

9. The method of claim 1, wherein the step of stepping through the selected channels further comprises utilizing a varactor to spread the energy of the data signal and to provide a frequency hopping sequence for transmission of the data signal.

10. The method of claim 1, wherein the step of stepping through the selected channels further comprises utilizing a varactor-transistor arrangement to spread the energy of the data signal and to provide a frequency hopping sequence for transmission of the data signal.

11. The method of claim 1, wherein the step of placing the data signal onto the RF carrier includes frequency modulating the carrier with the prepared data signal.

12. A method of communicating data comprising the steps of:
preparing a data signal for transmission, including applying a step spreading code to the data signal to spread the data signal frequency within a transmission bandwidth;
placing the data signal onto an RF carrier and ON/OFF keying the RF carrier based on the data signal;
transmitting the data signal on the RF carrier such that the data signal is stepped through a selected number of channels during the ON state of the ON/OFF keying thus spreading the data signal over the transmission bandwidth, thereby reducing interference effects from other RF communication devices and thus facilitating spectrum sharing; and
receiving and decoding the data signal in at least one wideband amplitude modulation (AM) receiver.

13. The method of claim 12, after decoding the data signal, further comprising the step of receiving and decoding the data signal at a plurality of AM receivers, wherein each of the receivers receives the data signal at a bandwidth less than an overall spread bandwidth.

14. The method of claim 13, while decoding the data signal at the narrowband receivers, further comprising the step of sensing a first step within a bit within the data signal and sweeping the narrowband receiver at the same rate as the steps are occurring across each bit, thereby increasing sensitivity and reducing interference.

15. The method of claim 13, after decoding the data signal, further comprising the steps of:
summing certain outputs of the plurality of narrowband AM receivers; and
rejecting output from any of the narrowband receivers that exhibit interference.

16. The method of claim 12, wherein the step of on/off keying the data signal further comprises the step of amplifying the data signal as its being transmitted.

17. The method of claim 12, wherein the step of on/off keying the data signal further comprises the step of utilizing a power oscillator to transmit the signal at a higher power level.

18. The method of claim 12, after decoding the data signal, further comprising receiving and decoding the data signal in, at least one, single AM receiver adapted to be synchronized to follow a frequency hopping sequence of the transmitted data signal.

19. The method of claim 12, wherein the step of placing the data signal onto the RF carrier includes frequency modulating the carrier wit the prepared data signal.

20. A transmitter device comprising:
a digital subsystem powered by a power supply adapted to process data from another device; and
a radio frequency (RF) sub-system adapted to transmit the processed data using a frequency hopping spread spectrum signal, the RF sub-system comprising a microprocessor arrangement adapted to ON-OFF key a voltage controlled oscillator (VCO) and to provide a frequency hopping scheme, the VCO coupled to a signal frequency spreading arrangement adapted to spread the signal to a predetermined transmission bandwidth, wherein the frequency hopping occurs on an ON state of the ON-OFF keying and wherein the transmission bandwidth exceeds a reception bandwidth at which the signal will be decoded.

21. The transmitter device of claim 20, wherein the frequency spreading arrangement includes a varactor-transistor circuit arrangement adapted to spread the signal to exceed a predetermined bandwidth.

22. The transmitter device of claim 21, wherein the varactor is adapted to be multiplexed to provide frequency hopping and to spread the transmitted signal's energy over a frequency that exceeds a predetermined bandwidth.

23. The transmitter device of claim 20, wherein the frequency spreading arrangement includes a pin diode circuit arrangement adapted to be multiplexed to provide frequency hopping and to spread the transmitted signal's energy over a frequency that exceeds a predetermined bandwidth.

24. The transmitter device of claim 20, wherein the voltage-controlled oscillator is a power oscillator adapted to transmit the signal at a higher power level.

25. The transmitter device of claim 21, wherein the varactor-transistor arrangement includes two varactors and two transistors, a first varactor adapted to provide frequency hopping and a second varactor adapted to spread the transmitted signal's energy over a frequency that exceeds a predetermined bandwidth.

26. The transmitter device of claim 20, further comprising a power amplifier adapted to boost the transmitted signal.

27. A meter end point encoder transmitter device, wherein the device is operably coupled to a utility meter that forms part of a utility meter reading system, the device comprising:
a digital subsystem powered by a power supply adapted to process consumption data from the utility meter; and
a radio frequency (RF) sub-system adapted to transmit consumption data from the utility meter using a frequency hopping spread spectrum signal, the RF sub-system comprising a microprocessor arrangement adapted to ON-OFF key a voltage controlled oscillator (VCO) and to provide a frequency hopping scheme, the VCO coupled to a varactor-transistor arrangement adapted to spread the signal to a predetermined transmission bandwidth, wherein the frequency hopping occurs on an ON state of the ON-OFF keying and wherein the transmission bandwidth exceeds a reception bandwidth at which the signal will be decoded.

28. A system for communicating data via RF comprising the steps of:
means for preparing a data signal for transmission, including applying a step spreading code to the data signal to spread the data signal frequency within a transmission bandwidth;
means for placing the data signal received from the means for preparing the data signal for transmission onto an RF carrier and ON/OFF keying the RF carrier based on the data signal;
means for transmitting the data signal on the RF carrier such that the data signal is stepped through a selected number of channels during the ON state of the ON/OFF keying thus spreading the data signal over the transmission bandwidth, thereby reducing interference effects from other RF communication devices and thus facilitating spectrum sharing; and
at least one amplitude modulation (AM) receiver adapted to receive and decode the data signal, wherein the AM receiver is adapted to be synchronized to follow a frequency hopping sequence of the transmitted data signal and to receive the data signal at a reception bandwidth such that the transmission bandwidth is greater than a reception bandwidth.

29. A system for communicating data via RF comprising the steps of:
means for preparing a data signal for transmission, including applying a step spreading code to the data signal to spread the data signal frequency within a transmission bandwidth;
means for placing the data signal received from the means for preparing the data signal for transmission onto an RF carrier and ON/OFF keying the RF carrier based on the data signal;
means for transmitting the data signal on the RF carrier such that the data signal is stepped through a selected number of channels during the ON state of the ON/OFF keying thus spreading the data signal over the transmission bandwidth, thereby reducing interference effects from other RF communication devices and thus facilitating spectrum sharing; and
at least one wideband amplitude modulation (AM) receiver adapted to receive and decode the data signal in.

30. A method of communicating data in a message sent via RF comprising the steps of:
a) preparing a data signal incorporating the message for transmission, including applying a step spreading code to the data signal to spread the data signal frequency within a transmission bandwidth;
b) placing the data signal onto an RF carder and ON/OFF keying the RF carrier based on the data signal;
c) transmitting the data signal in a single frequency per bit scheme, including, selecting a frequency of transmission prior to an ON state of the ON/OFF keying and holding at the selected frequency during the ON state such that each subsequent bit in the overall message corresponding to an ON state is transmitted at a different frequency than the previous bit corresponding to the previous ON state, thus spreading the energy of the data signal message over the transmission bandwidth, thereby reducing interference effects from other RF communication devices and thus facilitating spectrum sharing;
d) receiving and decoding the data signal in at least one receiver, the receiver being adapted to decode a data signal encoding scheme for each message, the signal encoding scheme being selected from the group consisting of frequency changes that occur in each message and all the frequencies used in transmitting the message, the receiver being synchronized to follow a frequency selection sequence of the transmitted data signal and to receive the data signal at a reception bandwidth, wherein the transmission bandwidth is greater than a reception bandwidth.

31. The method of claim 30, further comprising the step of adding a special preamble code to the message that provides a synchronization pattern of frequencies that allow the at least one receiver to utilize any one of the pattern frequencies to monitor those used in the synchronization pattern thereby providing interference protection.

32. The method of claim 30, after decoding the data signal, further comprising the steps of:
implementing an adaptive error correction algorithm for correcting a predefined number of errors, the error correction algorithm being is implemented upon detecting a high bit error rate on any combination of frequencies; and
selecting a correction algorithm for the high bit error rate, the correction algorithm selected from the group consisting of a new set of frequencies and additional overhead bits that utilize the existing frequencies, wherein providing the additional bits on the message would correct for the bits lost on corrupted frequencies.

33. The method of claim 30, wherein the step of placing the data signal onto the RF carrier includes frequency modulating the carrier with the prepared data signal.

34. A meter end point encoder transmitter device, wherein the device is operably coupled to a utility meter that forms part of a utility meter reading system, the device comprising:
a digital subsystem powered by a power supply adapted to process consumption data from the utility meter; and
a radio frequency (RF) sub-system adapted to transmit consumption data from the utility meter using a spread spectrum signal, the RF sub-system comprising a microprocessor arrangement adapted to ON-OFF key a voltage controlled oscillator (VCO) and to select an new frequency of transmission for every bit of the consumption data, the VCO coupled to a varactor-transistor arrangement adapted to spread the signal to a predetermined transmission bandwidth, wherein the transmission bandwidth exceeds a reception bandwidth at which the signal will be decoded.

35. The transmitter device of claim 34, further comprising a resistive ladder coupled between the microprocessor arrangement and a varactor tuning diode coupled to the VCO, wherein the resistive ladder functions to change the transmission frequency.

36. The transmitter device of claim 34, further comprising a digital to analog converter coupled between the microprocessor arrangement and a varactor tuning diode coupled to the VCO, wherein the digital to analog converter functions to change the transmission frequency.

* * * * *